W. BOULAIS.
TRACTOR.
APPLICATION FILED DEC. 16, 1918.
1,340,112.
Patented May 11, 1920.
4 SHEETS—SHEET 4.
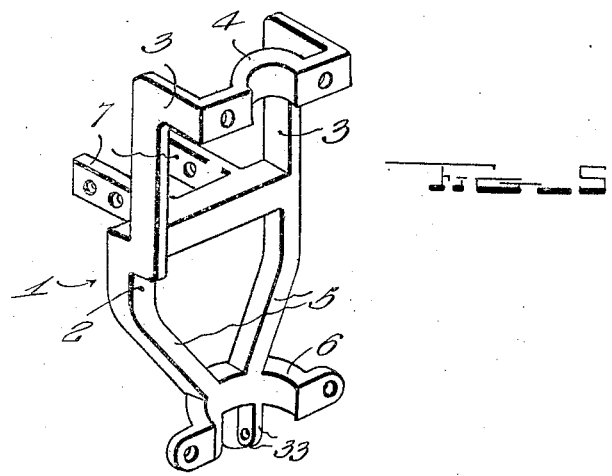
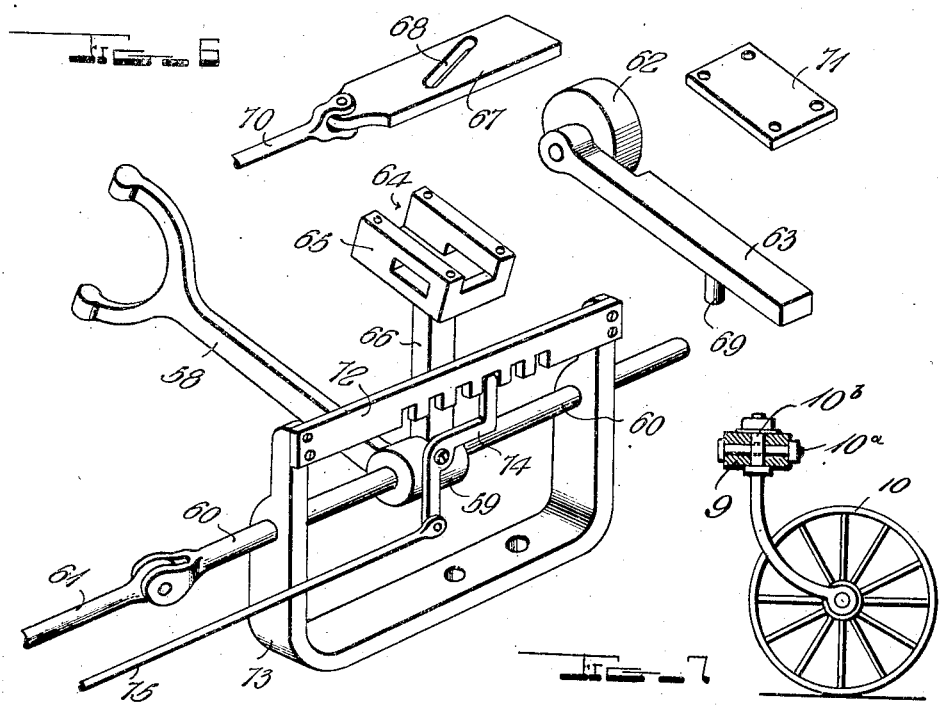
Witness
Inventor
Wilfrid Boulais
By H. B. Willson & Co.
Attorneys

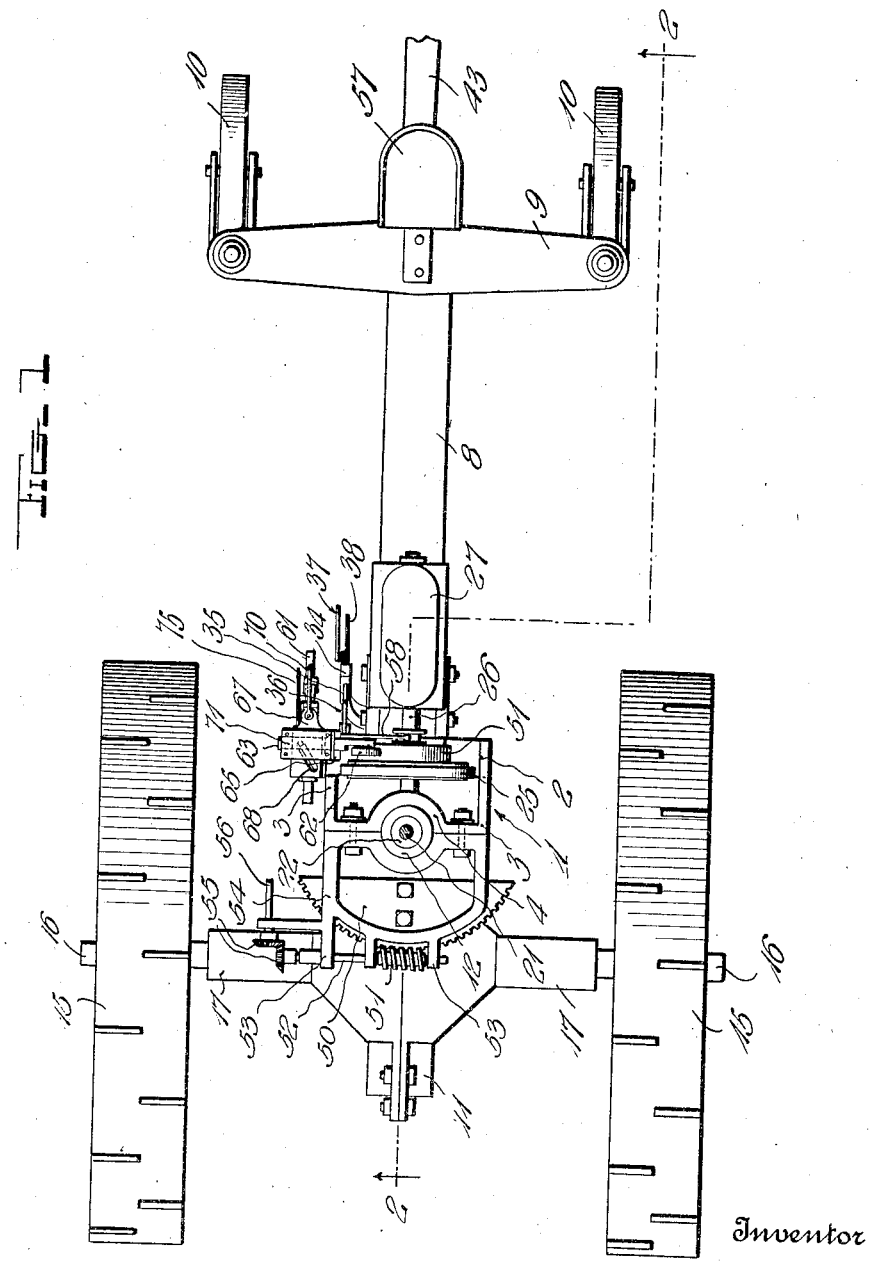

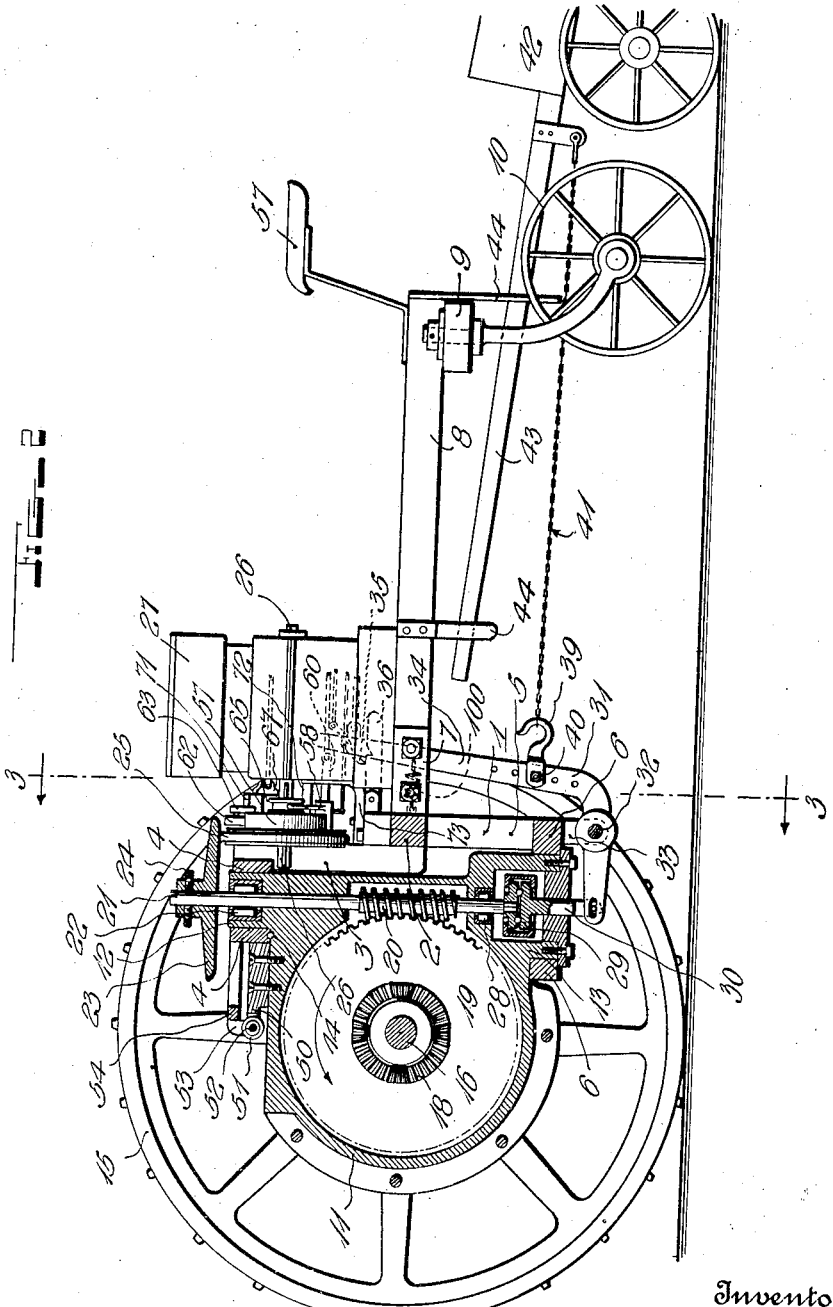

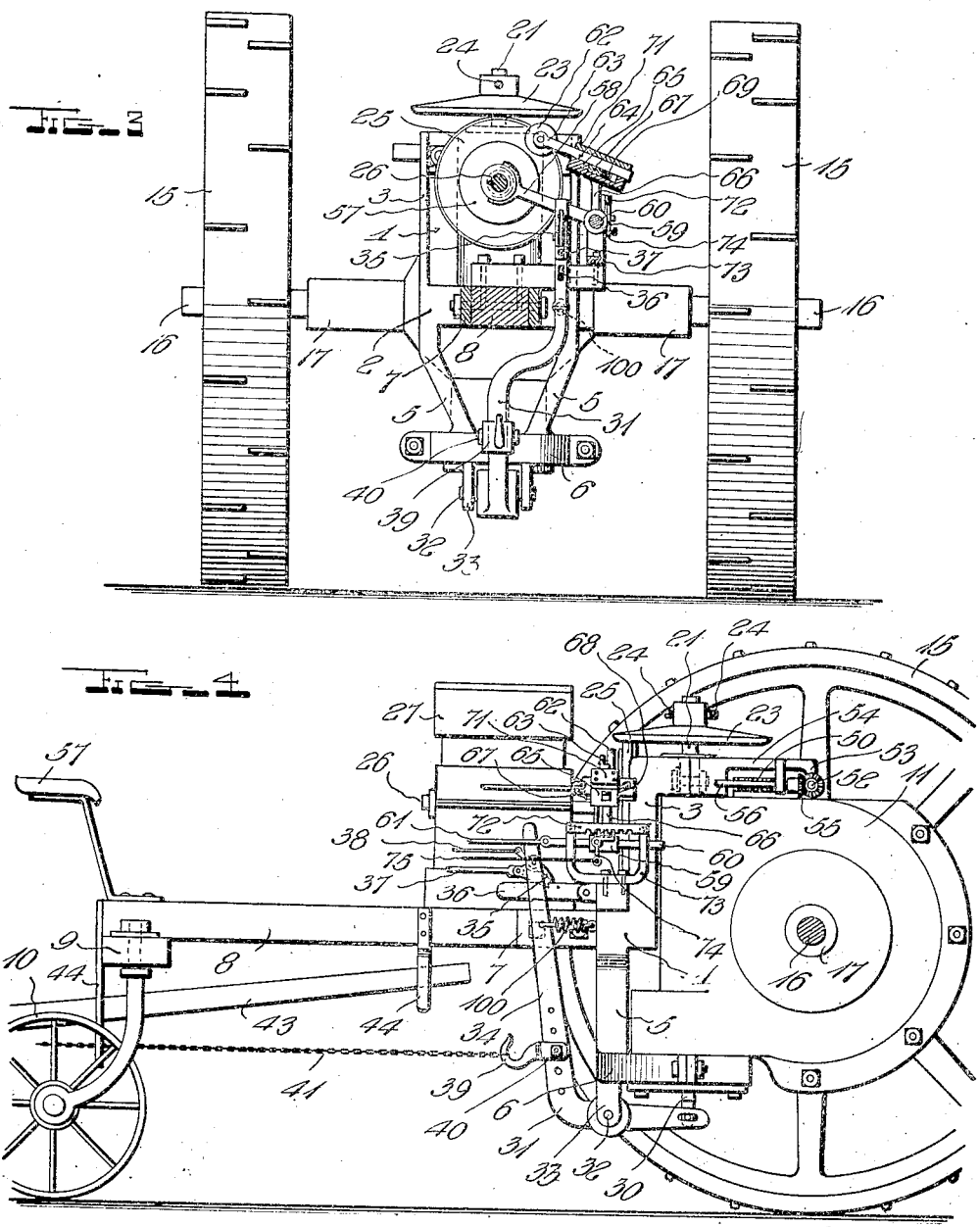

UNITED STATES PATENT OFFICE.

WILFRID BOULAIS, OF IPSWICH, MASSACHUSETTS.

TRACTOR.

1,340,112.  Specification of Letters Patent.  Patented May 11, 1920.

Application filed December 16, 1918. Serial No. 266,999.

*To all whom it may concern:*

Be it known that I, WILFRID BOULAIS, a citizen of the United States, residing at Ipswich, in the county of Essex and State of Massachusetts, have invented certain new and useful Improvements in Tractors; and I do declare the following to be a full, clear, and exact description of the invention, such as will enable others skilled in the art to which it appertains to make and use the same.

My invention relates to improvements in motor driven vehicles and more particularly to tractors. Heretofore, on machines employing a worm drive, the tendency of the worm to shift longitudinally, has caused considerable difficulty, particularly when a friction driving gear is employed, since it has been found that this endwise thrust is liable to draw one friction disk so tightly against the other as to cause unnecessary wear, not only of the friction surfaces, by the bearings of the several shafts.

The principal object of my invention is to provide means for automatically counterbalancing the endwise thrust of the worm, so as to prevent such occurrences as those above pointed out, and to this end, provision is made for forcing upon the worm in an opposite direction from its endwise thrust, such forcing being proportional to the resistance of the load.

Another object is to provide a tractor which will be comparatively simple and inexpensive, yet highly efficient and in every way desirable.

With the foregoing in view, the invention resides in the novel features of construction and unique combination of parts hereinafter fully described and claimed, reference being made to the accompanying drawings.

Figure 1 is a top plan view of a tractor constructed in accordance with my invention.

Fig. 2 is a side elevation with parts in section on the plane of the line 2—2 of Fig. 1.

Fig. 3 is a vertical transverse section as seen on the plane of line 3—3 of Fig. 2.

Fig. 4 is an elevation of the opposite side of the machine from that seen in Fig. 2.

Fig. 5 is a perspective view of the head casting.

Fig. 6 is a disassembled perspective of parts of the reverse gearing.

Fig. 7 is a detail section showing a means for locking the caster wheel standards against turning.

In the drawings above briefly described, the numeral 1 designates a head casting which is shown most clearly in Figs. 2 and 5, said casting including a body 2 from which a pair of arms 3 rise to carry an upper bearing 4 which is preferably of two parts as shown. Arms 5 depend from the body 2 and carry a lower bearing 6 which is axially alined with the bearing 4 and likewise of sectional construction. The rear edge of body 2 is shown provided with a pair of lugs 7 which are bolted or otherwise secured to opposite sides of a longitudinal beam 8. The rear end of beam 8 is supported upon a transverse bolster 9 having caster wheels 10 at its ends. These wheels are nothing more than supports for the rear end of the machine, since all of the driving and steering is accomplished by the mechanism at the front end in a manner to be fully described. By means of bolts 10$^a$ or other suitable means, the standards 10$^b$ of the wheels 10 may be locked against turning as seen in Fig. 7. This is done when the tractor is not pulling any other implement; otherwise it could not be steered.

A gear case 11 is mounted in front of the casting 1 and is provided on its rear edge with upper and lower trunnions 12 and 13 which are received in the upper and lower bearings 4 and 6, respectively, and if desired, ball bearings or the like 14 may be interposed between the upper bearing and said gear case as shown in Fig. 2. By mounting the gear case upon the trunnions 12 and 13, it may swing horizontally to steer the machine, it being by this gear case that the two front tractor wheels 15 are carried. The wheels 15 are secured on the ends of an axle 16 which is rotatable in suitable bearings 17 projecting from the gear case 11, the center of said axle being provided with the usual or any preferred type of differential gearing 18 and with the worm gear 19 for driving such gearing.

In rear of the worm gear 19 and meshing therewith, is a vertical worm 20, said worm being fixedly carried on the vertical shaft 21 which rises through a roller bearing 22 within the upper trunnion 12, the upper end of said shaft having a downwardly facing friction disk 23 which is rigidly mounted by any preferred means such as the set screw 24. The lower face of disk 23 is adapted for contact with the periphery of the friction driving disk 25 which is either secured directly to the shaft 26 of a motor 27, or may be connected to said shaft by means of a suitable clutch, not shown; and through the instrumentality of means yet to be described, disk 25 may be shifted radially upon the disk 23 to vary the speed of the machine.

Considering only the features so far described, it will be observed that as the worm 20 is turned in a direction to drive the wheels 15 forwardly, said worm has a tendency to pull downwardly on the shaft 21, thus causing an injurious amount of downward pressure upon the disk 25. This has a tendency to warp disk 23, to spring the shaft 21, and to wear the bearing 22 as well as the bearings of the shaft 26. To prevent these undesirable occurrences I have provided the novel arrangement of parts now to be described in detail, with the understanding that the several minute features specified, may be varied as occasion may demand, within the scope of the invention.

Below the lower roller bearing 28 of the shaft 21, the trunnion 13 is recessed, and within this recess a thrust bearing 29 is located to receive the downward thrust of the worm 20, and since this thrust increases according to the resistance of the load, it is highly expedient to provide means for exerting an upward stress on the thrust bearing, substantially equal to the downward thrust of the worm. To this end, I have shown a stem 30 depending from the thrust bearing 29 and connected to the short arm of a bell crank lever 31 or other suitable member. Lever 31, as shown, is fulcrumed on a pin 32 which extends between lugs 33, said lugs depending from the bearing 6. The long arm 34 of lever 31 is offset as seen in Fig. 3 so as to position it at one side of the beam 8, the upper end of said arm 34 being provided with any suitable dog 35 engaging a single tooth rack 36 (see Figs. 2 and 4). A control rod, cable or the like 37 extends rearwardly to any suitable point from the arm 34 and adjacent said rod is located a release rod or cable 38 for the dog 35. By pulling rearwardly upon rod 37, the lever 31 may be shifted to raise the thrust bearing 29 and shaft 21 in such manner as to disengage the disks 23 and 25 to stop the machine, the lever being then held in position by the dog 35 and rack 36. It will, of course, be understood that only a very slight movement of the disk 23 is necessary to move it out of driving contact with the disk 25 and the necessary movement of the shaft 21 may be permitted, for instance, by rather loosely meshing the worm 20 with the worm gear 19. When it is necessary to again start the machine, the dog 35 is released and the spring 100 so shifts the lever 31 as to lower the shaft 21 and place the disk 23 in driving contact with disk 25.

The arrangement so far specified would be sufficient, were it not for the fact that as the weight of the load increases, the worm 20 thrusts downwardly with greater force, but due to this fact, I have provided means for hitching the load to the arm 34 of lever 31, whereby to exert a moving tendency upon this lever sufficient to thrust upwardly on the bearing 29 an amount which will substantially counterbalance the downward thrust of the worm. In obtaining this result, a hook or other suitable hitch 39 is adjustably mounted at 40 on the arm 34, and a chain or other suitable draft member 41 leads rearwardly from this hitch to the implement 42 or to any other load being drawn, and in order that all of the pull shall be placed upon the chain 41, the tongue 43 of the implement is preferably received loosely in suitable guides 44 which depend from the beam 8.

By hitching the load to the lever 31, it is insured that the downward thrust of the worm 20, regardless of the resistance of the load, is sufficiently counterbalanced to prevent injury to the driving gear or to any other parts, and it will be observed that the upward thrust on bearing 29 is in strict proportion with the resistance of the load, a light load exerting only a slight upward thrust on the bearing, while stronger resistance caused by a relatively heavy load will thrust upwardly with greater force upon said bearing.

Preferably, I employ a friction driving gear such as above specified, but beveled gears might well be substituted for the disks 23 and 25, in which case injury to such gears would be prevented by the thrust counterbalancing means above described. Also, in employing the aforesaid thrust counterbalancing means on machines of different types from that shown, any other adequate driving means for the shaft 21 could well be utilized; and I therefore wish it clearly understood that the terms of the appended claims do not restrict me to friction disks.

The steering gear might well be of any preferred construction, but I preferably mount a worm gear segment 50 on the upper end of the gear case 11 and mesh said segment with a worm 51 on a transverse shaft 52 which is rotatable in suitable bearings 53, said bearings being preferably carried by a frame 54 which extends forwardly from the upper bearing 4 of the head casting 1. By means of bevel gears or the like 55, shaft 52 may be rotated from a longitudinal steering shaft 56 which may lead rearwardly to any preferred location. Provision will preferably be made for steering either from the seat 57 on the beam 8, or from the implement being drawn by the tractor, and similarly the several controls will be of such nature as to permit of their operation from either location. These features, however, are more or less unimportant, may be provided for in any suitable way, and are not, therefore, illustrated or described in detail.

In connection with the features above described, I preferably, though not necessarily, employ a novel form of reverse gear which is constructed as or substantially as described below. A relatively small friction disk 57 is mounted on the shaft 26 for rotation bodily with the disk 25, the two disks being preferably of the one-piece construction shown, so that by means of a suitable arm 58 they may be bodily shifted along the shaft. Arm 58 projects laterally from a hub member 59 which is secured on the longitudinal bar 60, a control rod 61 being provided for shifting said bar forwardly and rearwardly, so that the disk 25 may be shifted with respect to disk 23 as occasion may demand. Adapted for contact with the two disks 23 and 57, but normally withdrawn therefrom and out of contact therewith, as in Fig. 3, is a reversing roller 62, and when this roller is forced tightly between said disks 23 and 57, and the lever 31 operated to raise the former from the disk 25, the machine will be reversely driven.

Any preferred means might well be employed for mounting and shifting the roller 62, but for illustrative purposes I have shown said roller carried on an arm 63 which slides in a groove 64 (Fig. 6), said groove being formed in a head 65 on an arm 66 which rises from the hub member 59. Below the arm 63, a slide 67 operates through the head 65, said slide being provided with a cam slot 68 into which a pin 69 on arm 63 projects. It will thus be seen that by shifting the slide 67, through the instrumentality of a suitable control rod 70, the arm 63 may be moved to project or retract the roller 62 as required.

A cover plate 71 is shown for securing the arm 63 in the groove 64, but other provision could well be made for this purpose.

To lock the hub member 59 in adjusted position, any adequate means could be used and the construction shown is for illustrative purposes only. A rack bar 72 is shown mounted on the bracket 73 which carries the bar 60, and a pivoted dog 74 mounted on the hub member 59, engages the teeth of said rack bar as shown most clearly in Fig. 6. A rod or the like 75 may lead rearwardly from the dog 74 adjacent the rod 61 for operating said dog in the required manner.

An arrangement for reversing, such as that disclosed, is preferably employed, since by such an arrangement, the reversing roller 62 is at all times maintained in the same plane with the disk 57 for immediate use whenever necessary. Furthermore, since the arrangement set forth will move both the roller 62 and the disk 57 simultaneously in axial directions, it will be seen that reversing may be done either at low or high speed.

From the foregoing, taken in connection with the accompanying drawings, it will be seen that although my invention is of comparatively simple and inexpensive nature, it will be highly efficient and in every way desirable, particular emphasis being laid upon the counterbalancing means and upon the novel reverse gear, although the general organization of the machine is also of considerable importance.

Since probably the best results are obtained from the details disclosed, they may be followed if desired, but within the scope of the invention as claimed, considerable latitude is allowed for making numerous minor changes.

What I claim is:

1. The combination with a motor driven vehicle having a worm drive; of a hitch for the load, and means operated by the resistance of the load on said hitch for thrusting endwise on the worm in the direction opposite that in which the latter tends to move while in operation.

2. The combination with a motor driven vehicle having a worm drive; of a thrust bearing to receive the endwise thrust of the worm, a movable member for exerting a stress on said bearing toward the worm, and means for hitching the load to said movable member, to exert a moving tendency thereon sufficient to counterbalance the endwise thrust of the worm.

3. The combination with a motor driven vehicle having a worm drive; of a thrust bearing to receive the endwise thrust of the worm, a lever fulcrumed on the vehicle and arranged for exerting a thrust on said means for hitching the load to said lever, to exert a moving tendency thereon sufficient to counterbalance the endwise thrust of the worm.

4. In a motor driven vehicle, a running gear including a gear case, a worm gear and a worm in said case for propelling the vehicle, a drive shaft upon which the worm is rigidly carried, a disk secured on one end of said shaft, and a driving disk contacting with said first named disk, a thrust bearing for the other end of the shaft, a lever fulcrumed adjacent said thrust bearing and associated therewith for exerting a thrust on said shaft opposite the thrust of the worm, and means for hitching the load to said lever, to exert a moving tendency thereon sufficient to counterbalance the endwise thrust of the worm.

5. In a motor driven vehicle, a frame, wheel supported at one end and having vertically opposed bearings at its other end, a gear case having vertical trunnions mounted in said bearings, an axle passing through said gear case and having traction wheels, a worm gear in said gear case for driving said axle, a vertical worm meshing with said worm gear, a vertical drive shaft on which said worm is fixedly carried, said shaft rising through the upper trunnion of the gear case, a disk secured on the upper end of said shaft, a driving disk contacting with said first named disk, a thrust bearing for said shaft mounted in the lower trunnion of said gear case, a lever fulcrumed on the bearing of said lower trunnion and associated with said thrust bearing for exerting a thrust thereon opposite the thrust of the worm, and means for hitching the load to said lever to exert a moving tendency thereon sufficient to counterbalance the endwise thrust of the worm.

6. The combination with a motor vehicle having a worm drive, and a friction driving gear therefor; of a thrust bearing to receive the thrust of the worm, means for adjusting said thrust bearing by hand to secure a proper frictional contact for said driving gear, and a hitch for the load associated with said adjusting means to exert a thrust on said thrust bearing sufficient to counterbalance the endwise thrust of the worm.

7. The combination with a motor vehicle having a worm drive, and a friction driving gear therefor; of a thrust bearing to receive the thrust of the worm, a hand operable lever for adjusting said thrust bearing to obtain a proper frictional contact for said gearing, and a hitch for the load connected to said lever for operating the same to exert sufficient stress on said thrust bearing to counterbalance the endwise thrust of the worm.

In testimony whereof I have hereunto set my hand.

WILFRID BOULAIS.